United States Patent
Serban

[19]

[11] Patent Number: 5,983,590
[45] Date of Patent: Nov. 16, 1999

[54] EARTHQUAKE RESISTANT EQUIPMENT RACK

[75] Inventor: Vasile Serban, Rocky River, Ohio

[73] Assignee: The Crown Division, Wooster, Ohio

[21] Appl. No.: 08/865,496

[22] Filed: May 29, 1997

[51] Int. Cl.[6] .................................. E04H 9/02; A47F 7/00
[52] U.S. Cl. ........................ 52/656.1; 52/656.2; 52/656.9; 52/167.3; 52/167.1; 211/26
[58] Field of Search .................. 52/656.1, 656.2, 52/638, 656.9, 223.8, 167.3, 167.1; 211/26, 189, 190

[56] References Cited

U.S. PATENT DOCUMENTS

| | | |
|---|---|---|
| 1,957,362 | 5/1934 | Smith . |
| 3,789,174 | 1/1974 | Barkan et al. . |
| 3,905,483 | 9/1975 | Patrick ........................................ 211/26 |
| 4,065,218 | 12/1977 | Biggane ............................. 52/167.3 X |
| 4,497,411 | 2/1985 | DeBortoli . |
| 4,553,674 | 11/1985 | Yoshikawa et al. . |
| 4,715,502 | 12/1987 | Salmon . |
| 4,899,892 | 2/1990 | Rheault . |
| 5,004,107 | 4/1991 | Sevier et al. . |
| 5,284,254 | 2/1994 | Rinderer . |
| 5,310,156 | 5/1994 | Matsumura et al. . |
| 5,323,916 | 6/1994 | Salmon . |
| 5,363,613 | 11/1994 | Sevier . |
| 5,383,723 | 1/1995 | Meyer ................................. 52/167.3 X |
| 5,540,339 | 7/1996 | Lerman . |
| 5,566,836 | 10/1996 | Lerman . |
| 5,584,406 | 12/1996 | Besserer et al. . |
| 5,683,001 | 11/1997 | Masuda et al. ............................ 211/26 |
| 5,727,358 | 3/1998 | Hayahsi et al. ..................... 52/655.1 X |
| 5,746,033 | 5/1998 | Chuang ............................... 52/656.1 X |
| 5,819,956 | 10/1998 | Rinderer ..................................... 211/26 |

Primary Examiner—Carl D. Friedman
Assistant Examiner—Brian E. Glessner
Attorney, Agent, or Firm—Oldham & Oldham Co. L.P.A.

[57] ABSTRACT

The earthquake resistant equipment rack of the present invention includes a base having integrally formed upstanding walls on each end to provide structural rigidity to the connection of the base and a plurality of vertical upright members. The upstanding walls increase the rigidity of the base in conjunction with the vertical members, and also work in conjunction with gussets to further increase the rigidity and stiffness at the base. The gussets are comprised of a vertical wall which is notched on one end to be coupled to a front wall or channel in the base. The gussets also include a top wall and back wall which are directly coupled to the vertical upright members positioned in association with the base. A channel top is coupled between the uppermost portions of the vertical upright members providing the rack with a rectangular frame structure. Channel stiffeners, which consist of relatively short metal members, are coupled to the upper and lower ends of the vertical upright members at the points at which the vertical upright members are coupled to the top and the base. The channel stiffeners transfer lateral stress from the vertical upright members to the base and top of the rack, making the rack's frame stronger and increasing the stiffness in the lateral direction throughout and along the vertical upright members. The base, vertical upright members, top, gussets and stiffening members are all coupled to one another by means of seam welds.

18 Claims, 5 Drawing Sheets

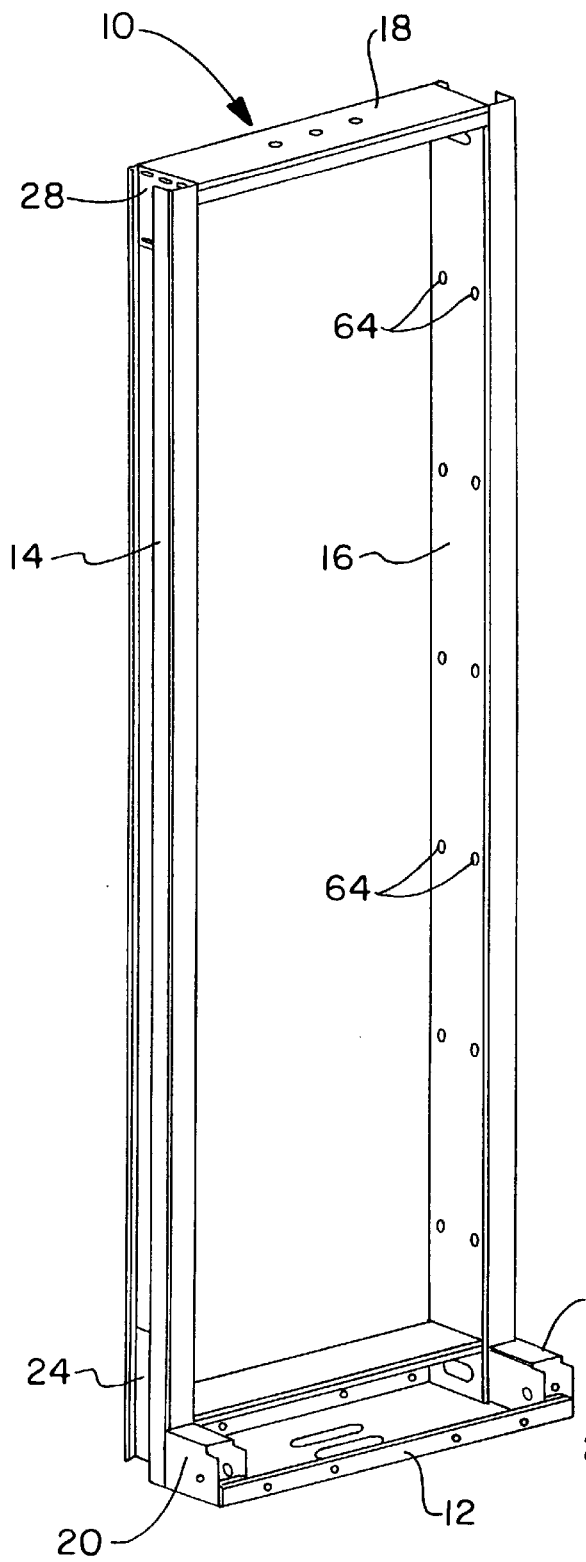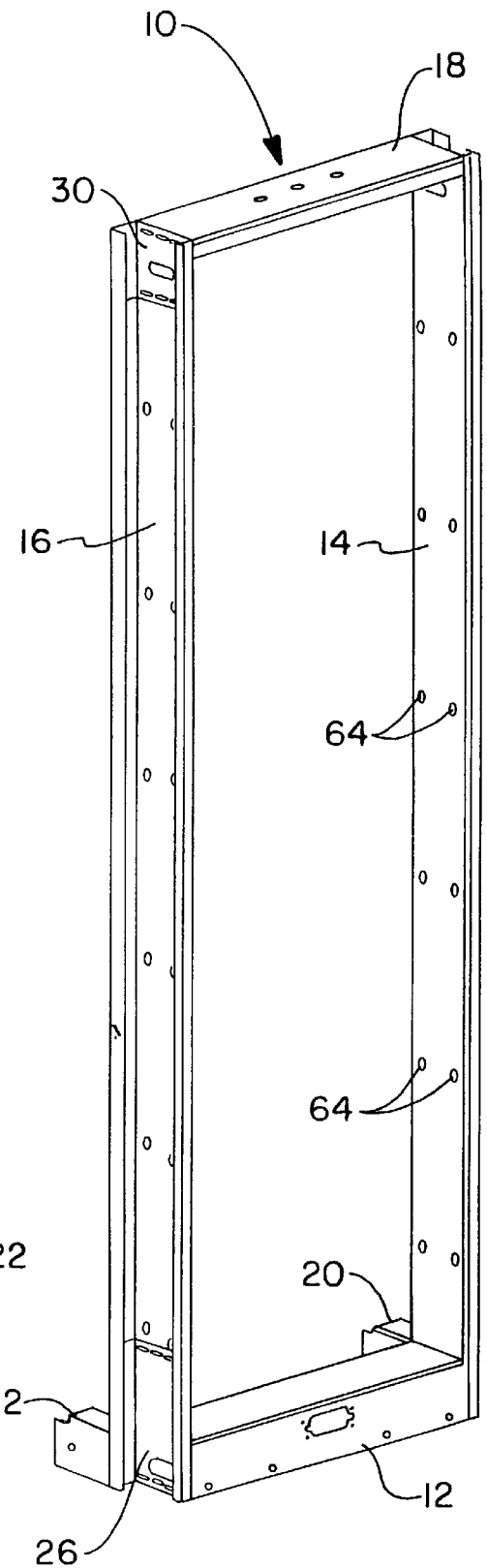

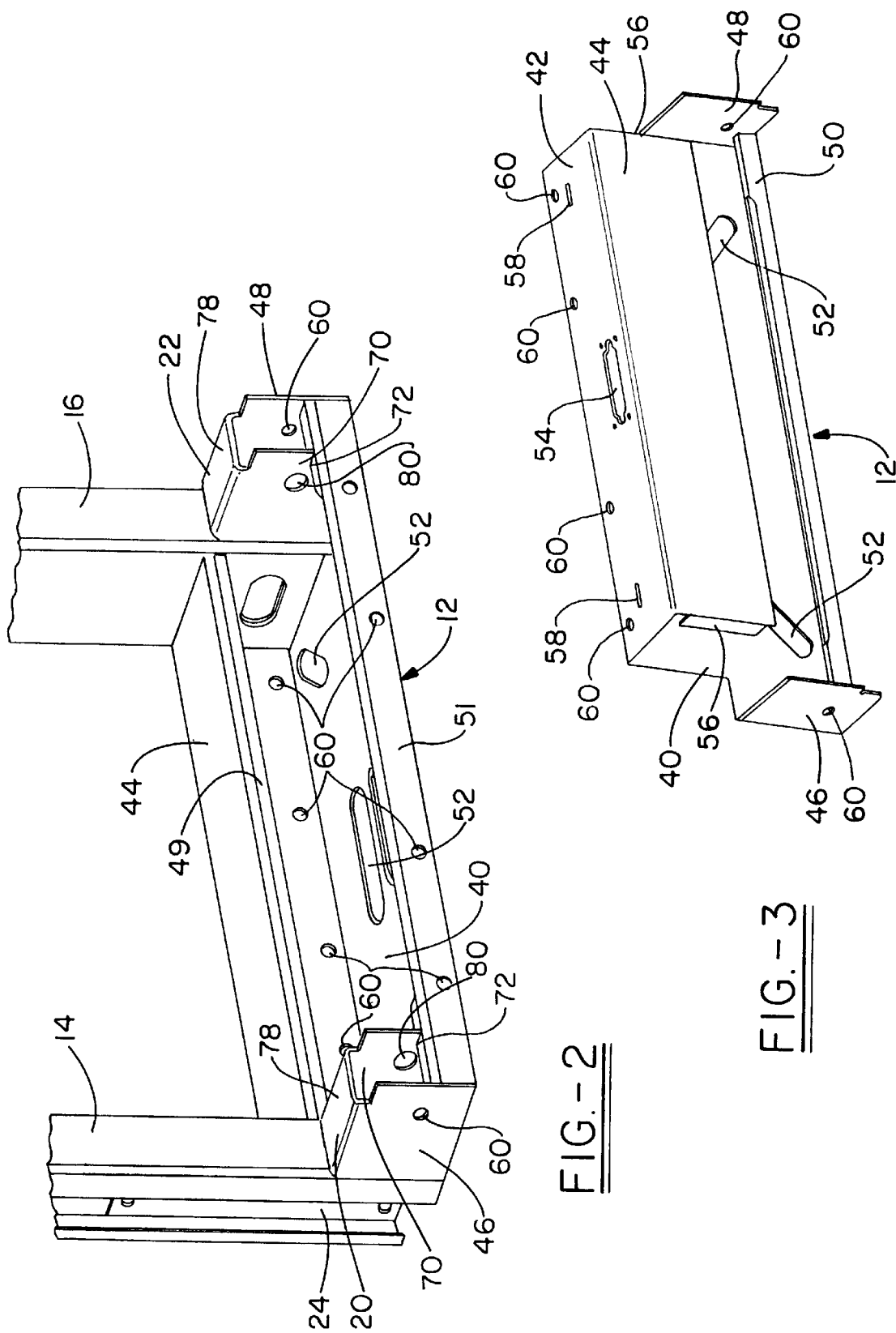

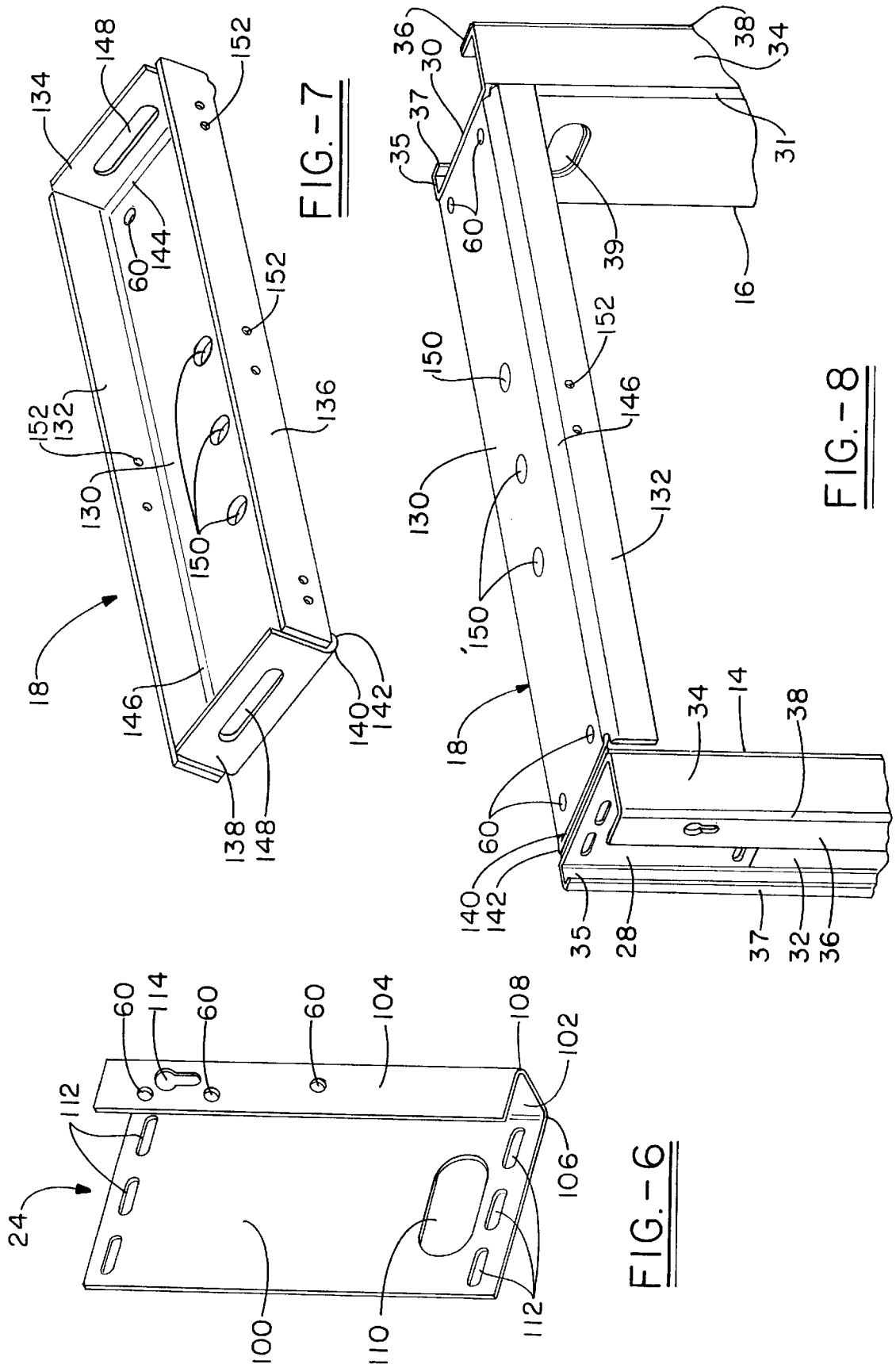

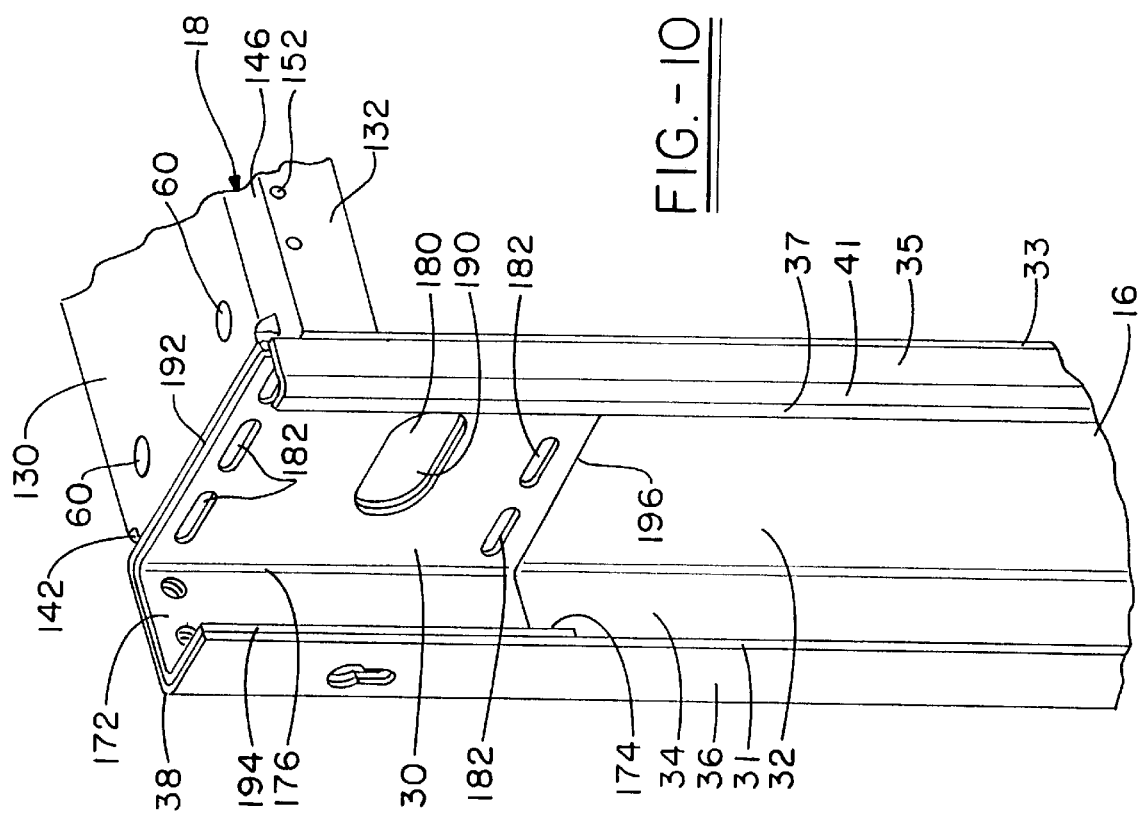
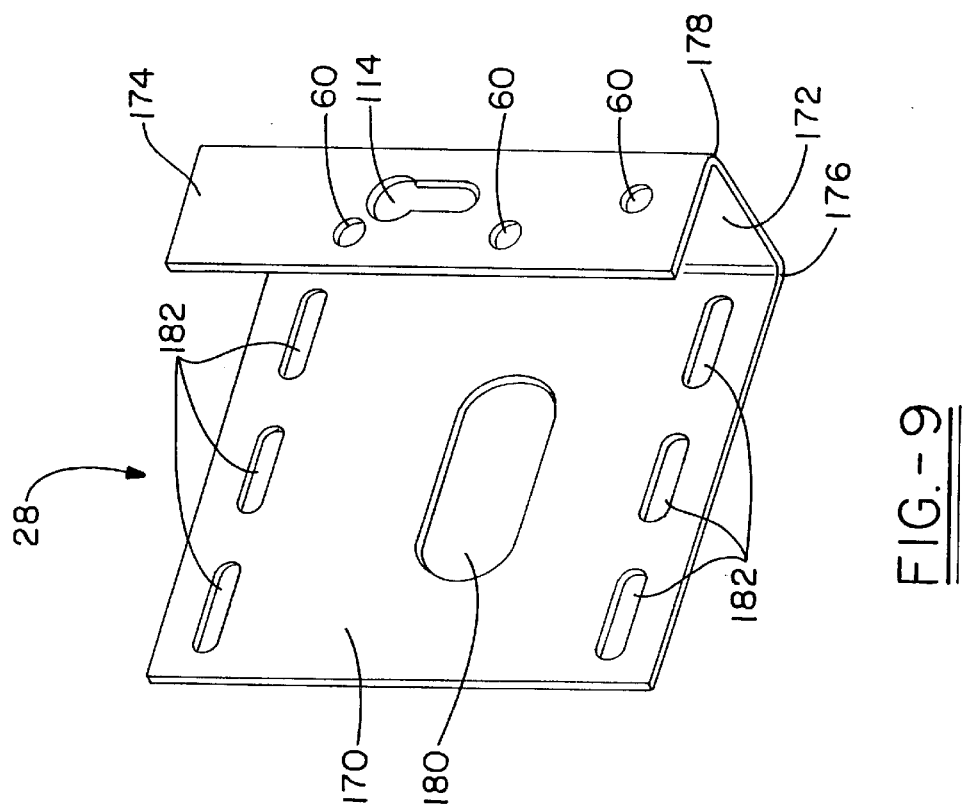

EARTHQUAKE RESISTANT EQUIPMENT RACK

TECHNICAL FIELD

The present invention relates generally to racks for electrical equipment and, more particularly, to a rack for electrical equipment which can withstand abnormal seismic activity typical of areas prone to earthquakes and other destructive natural phenomena.

BACKGROUND OF THE INVENTION

Preservation of electronic equipment during earthquakes and after shocks for the maintenance of communications and other purposes is a major concern of earthquake preparedness. As there is a critical need for communications immediately after an earthquake in a populated area, it is important for communications equipment to be able to withstand the most severe earthquakes or seismic shocks which can be expected to occur in the vicinity of such equipment.

With the introduction of electronic and fiber optic telephone switching equipment, the density of calls being handled in one equipment rack or network bay has advanced significantly. Today as many as 20,000 telephone lines could be interrupted with the loss of one bay of equipment. This has made the reliability of telephone switching equipment and its supporting structure critically important. Traditionally earthquake protection has been achieved by providing equipment racks or network bays with relatively massive bracing or using heavier materials, which both add significantly to the cost.

During seismic motion the base of a tall, slender, frame moves with the floor to which it is anchored. If the frame is sufficiently rigid and well anchored it will closely follow the motions of the base and floor. If, however, the frame is more flexible, it will move at a rate different to that of the base and floor, and consequently experience high stresses and deflections.

Therefore, in light of the foregoing deficiencies in the prior art, Applicant's invention is herein presented.

SUMMARY OF THE INVENTION

Accordingly, one object of the present invention is to provide an electronic equipment rack which protects equipment mounted therein from damage due to earthquakes and seismic motion.

It is a related object of the present invention to provide an electronic equipment rack having substantially increased overall strength without using heavier materials which otherwise would increase the racks overall weight.

It is a further object to provide an electronic equipment rack having fewer components and requiring fewer manufacturing steps thereby keeping production costs to a minimum.

An additional object is to provide an electronic equipment rack with increased stiffness along the horizontal axis distributed throughout the rack vertically without increasing the weight of the rack.

Generally, the present invention includes a base having integrally formed upstanding walls on each end to provide additional structural rigidity to the connection of the base and a plurality of vertical upright members. The upstanding walls increase the rigidity of the base in conjunction with the vertical members, and also work in conjunction with gussets to further increase the rigidity and stiffness at the base. The gussets are comprised of a vertical wall which is notched on one end to be coupled to a front wall or channel in the base. The vertical wall may include a small inwardly directed horizontal flange to facilitate positioning and increase stiffness. The gussets also include a top wall and back wall which are directly coupled to the vertical upright members positioned in association with the base. The electronic equipment rack of the present invention also includes a channel top coupled between the uppermost portions of the vertical upright members providing the rack with a rectangular frame structure.

The invention resides, more specifically, in the improvement of using channel stiffeners at maximum stress positions to increase the racks lateral force tolerance thereby increasing the racks strength in its weakest direction. The channel stiffeners consist of relatively short metal members which are coupled to the upper and lower ends of the vertical upright members at the points at which the vertical upright members are coupled to the top and the base. These coupling positions are subjected to the highest stress levels of any point on the equipment rack. The channel stiffeners transfer lateral stress from the vertical upright members to the base and top of the rack, making the rack's frame stronger and increasing the stiffness in the lateral direction throughout and along the vertical upright members. The base, vertical upright members, top, gussets and stiffening members are all coupled to one another by means of seam welds. In addition, certain components include various differently shaped apertures which allow additional welds to be added to distribute stresses and increase the strength of the various couplings included in the equipment rack.

These along with other objects and advantages of the present invention will become more readily apparent from a reading of the detailed description taken in conjunction with the drawings and the claims.

BRIEF DESCRIPTION OF THE DRAWINGS

FIG. 1 is a perspective view of a rack of the present invention with FIG. 1a being the front of the rack and FIG. 1b being the back of the rack;

FIG. 2 is a partial perspective view of a rack of the present invention showing the coupling of the base, upright members, gussets and lower channel stiffeners;

FIG. 3 is a perspective view of the base of the rack of the present invention;

FIG. 6 is a perspective view of a lower channel stiffener used to add support and strength to the rack of the present invention;

FIG. 7 is a perspective view of the channel top of the rack of the present invention showing the underside of the channel top;

FIG. 8 is a partial perspective view of the channel top, the upright members and the upper channel stiffeners of the rack of the present invention in operable cooperation;

FIG. 9 is a perspective view of an upper channel stiffener used to add support and strength to the rack of the present invention;

FIG. 10 is a partial perspective view of an upper channel stiffener, an upright member and the channel top of the rack of the present invention in operable cooperation.

DETAILED DESCRIPTION OF THE PREFERRED EMBODIMENT

Figures 4, 5:
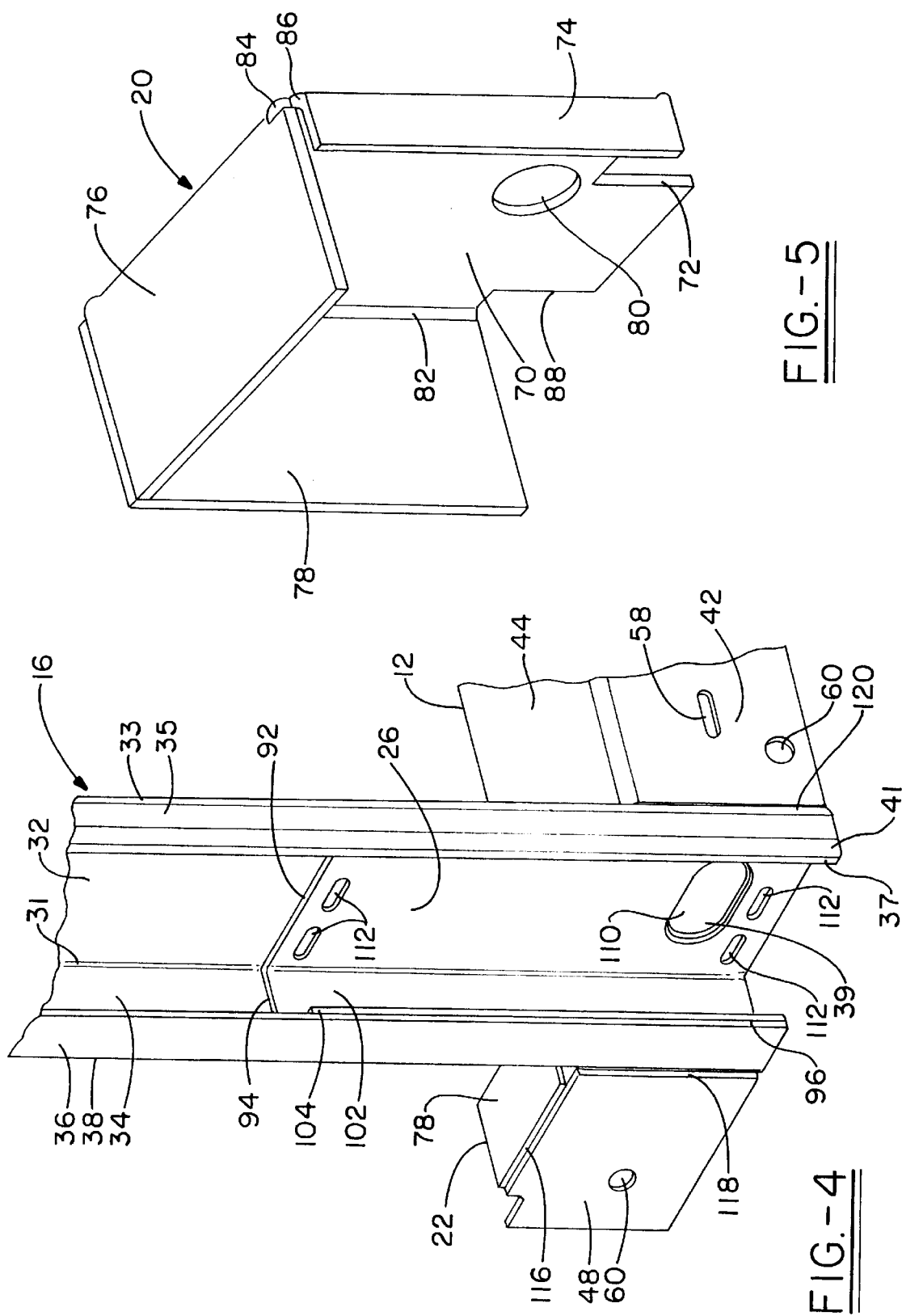
FIG. 4 is a partial perspective view of a lower channel stiffener, an upright member and the base of the rack of the present invention in operable cooperation.
FIG. 5 is a perspective view of a gusset used to add support and strength to the rack of the present invention.

Referring to FIG. 1, the electronic equipment rack 10 illustrated therein comprises a base 12, two upright members 14 and 16, and a channel top 18 coupled in a predetermined manner to form a rack for supporting various types of electronic equipment, such as electronic and fiber optic telephone switching equipment. Channel top 18 is welded to upright members 14 and 16, which are also welded to base 12. Base 12 is then anchored by bolts to a concrete floor in which the electronic equipment held by the rack 10 is ultimately installed.

To maintain the structural integrity of rack 10, a number of stiffeners and supports are welded at the weakest positions and points of highest stress on rack 10. Two gussets 20 and 22 are welded to base 12 at the points of upright members 14 and 16 which are themselves coupled to base 12. Gussets 20 and 22 are essentially brackets which strengthen the angles in the frame work of rack 10 created at the points of coupling between base 12 and upright members 14 and 16. To further improve the strength of equipment rack 10, lower channel stiffeners 24 and 26 and upper channel stiffeners 28 and 30 are welded to the framework of rack 10 at opposite ends of upright numbers 14 and 16 at the points which couple with channel top 18 and base 12.

Base 12 is shown in greater detail in FIG. 3, and comprises a floor 40, an integrally formed back wall 42 and partial top 44, also integrally formed with back wall 42. To provide partial top 44 with increased strength and stiffness two vertical end flanges 56 are integrally formed at either end of partial top 44 with the vertical side flanges 56 extending downward from the ends of partial top 44. For the same reason, that being increased strength, lengthwise vertical flange 49 is integrally formed with partial top 44 and extends downward from the lengthwise side of partial top 44 opposite back wall 42. Base 12 also includes integrally formed front wall 51 which includes horizontal flange 50 integrally formed and extending toward back wall 42.

Base 12 also includes integrally formed upstanding side walls 46 and 48 formed on each end of base 12 to provide additional structural rigidity to the coupling of base 12 and upright members 14 and 16. The floor 40 of the base is reinforced solely about the periphery therof. Each of the upstanding side walls 46 and 48 include one or more cable access apertures 60 used for running electrical cables to and from electronic equipment rack 10 and the numerous pieces of equipment mounted therein. Back wall 42 of base 12 also includes a plurality of cable access apertures 60 and one or more connector mounting apertures 54 which allow standard electrical connectors such as multi-pin D-subconnectors to be mounted to back wall 42. This allows electrical connection to equipment stored in rack 10 without applying stress to the individual electrical conductors as would be the case if they were not mounted to a structurally firm surface such as back wall 42. Depending on the types of electrical conductors being fed to and from equipment rack 10, various differently shaped apertures may be needed as illustrated by elongated cable access apertures 58. It should also be noted, as shown in FIG. 2, that front wall 51 of base 12 may also be fitted with a number of cable access apertures 60.

As shown in both FIGS. 2 and 3, floor 40 of base 12 also contains a number of floor mounting apertures 52 which allow bolts to be used to anchor base 12 to a concrete floor in which the electronic equipment mounted in rack 10 is ultimately installed. Anchoring base 12 is necessary as during seismic motion base 12 will move with the floor to which it is anchored. To prevent destruction of electronic equipment, rack 10 must be well anchored so that it will closely follow the motions of the floor and base 12.

FIG. 2 shows the various points of coupling to base 12 of rack 10, many of which will be described in further detail later. Vertical upright members 14 and 16 are positioned in contact with two of the corners of base 12 and adjacent to partial top 44 such that side flanges 56 come in contact with the respective vertical upright members. Due to the positioning of vertical upright members 14 and 16, they are also adjacent and come in contact with vertical side walls 46 and 48 respectively. The vertical side walls provide additional structural rigidity to the connection between base 12 and the vertical upright members 14 and 16. Lower channel stiffeners 24 and 26 are coupled to the vertical upright members 14 and 16 at the point of coupling to base 12 and provide further increases in the stiffness and rigidity of the coupling at base 12. Finally, gussets 20 and 22 are coupled to base 12 adjacent vertical side walls 46 and 48 so that gussets 20 and 22 come in contact with base 12, vertical side walls 46 and 48 and vertical upright members 14 and 16 respectively. While all points of coupling between the various components of rack 10, as shown in FIG. 2, are reinforced by means of seam welds, a conventional method of attaching metal members. Based upon the structural distinctions of the various components fewer welds are required in the construction of the assembly thereby making it simpler to manufacturer and providing increased performance over electronic equipment racks of the prior art. The various components which make up equipment rack 10 will now be described in further detail, both individually and in operable cooperation.

Turning to FIG. 4, vertical upright member 16 is comprised of vertical wall 32 having a relatively wide front flange 34 terminating in perpendicular rearwardly directed lip 36. Vertical wall 32 also includes a relatively narrow rear flange 35 terminating in perpendicular forwardly directed lip 37. All of the various components of vertical upright 16 are integrally formed from a single piece of metal framework through predetermined vertical bends. Both vertical upright members 14 and 16 contain a plurality of mounting apertures 64 along their lengths for use in mounting electrical equipment therebetween. Additional components of rack 10 shown in FIG. 4, i.e., gussets 20 or 22 and lower channel stiffeners 24 or 26, will now be described.

Referring to FIG. 5, gusset 20 is comprised of vertical side wall 70 having back wall 76 and top 78 formed integral with vertical side wall 70. Vertical side wall 70 may also include a small inwardly directed horizontal flange 74 to facilitate positioning of gusset 20 and to increase stiffness. All components of gusset 20 are integrally formed of a single piece of metal through predetermined bends 82, 84 and 86, respectively. Vertical side wall 70 also includes one or more cable access apertures 80 and one or more notches 72 and 88. Front notch 72 provides relief which allows gusset 20 to properly couple with front wall 51 when positioned within base 12. Rear notch 88 is provided to allow access within the area formed within gusset 20 and vertical side wall 46 of base 12 for additional structural seam welds. Rear notch 88 also provides additional cable access within equipment rack 10. The integral formation of gusset 20, including horizontal flange 74, provides increased strength to the coupling of vertical upright members 14 and 16 to base 12 while at the same time being simple and inexpensive to manufacture.

To provide increased strength sufficient to withstand abnormal seismic activity it is important that equipment rack 10 be capable of withstanding lateral forces throughout its vertical orientation. In addition, rack 10 must be able to withstand abnormal forces at the points of its frame which experience maximum stress levels. In the present invention, maximum stress develops at the points of coupling between channel top 18 and vertical upright members 14 and 16 and the coupling of base 12 to vertical uprights members 14 and 16, or at the four corners of the rectangular frame which makes up rack 10. To counter lateral forces and the cased stress at the couplings of the rectangular frame, the present invention employs channel stiffeners which strengthen the frame's couplings and transfers lateral forces to stronger portions of the rectangular frame. To accomplish this, two sets of channel stiffeners are used, lower channel stiffeners 24 and 26 and upper channel stiffeners 28 and 30.

Lower channel stiffener 24, shown in FIG. 6, is comprised of vertical wall 100 having an integrally formed vertical side wall 102 with horizontal flange 104 extending in the inward direction to provide structural rigidity. Horizontal flange 104 contains a number of cable access aperture 60 and one or more hardware mounting apertures 114 to permit framework extension or other types of similar hardware to be coupled to or to extend from rack 10. Lower channel stiffener 24 is also fabricated from a single piece of metal with its individual walls and flanges formed through bends 106 and 108 which allows the channel stiffeners to be fabricated easily while providing substantial structural rigidity. Vertical wall 100 includes one or more cable access apertures 110 and a plurality of a elongated weld apertures 112 positioned near, and extending in parallel with the upper and lower ends of vertical wall 100. As will be described later in further detail, elongated weld apertures 112 provide additional coupling strength between vertical upright members 14 and 16 and their respective lower channel stiffeners 24 and 26, by providing additional weld connections in addition to the seam welds which are applied along the outer edges of lower channel stiffener 24.

Returning to FIG. 4, the lower coupling configuration of the rectangular frame of equipment rack 10 will be described in more detail. Lower channel stiffener 26, with its vertical side wall 102 and horizontal flange 104, is configured to correspond to the channel shape formed within vertical upright member 16. Channel stiffener 26 is slide inside the channel formed within vertical upright member 16 such that cable access aperture 39 of vertical upright member 16 and cable access aperture 110 of lower channel stiffener 26 are aligned to provide complete passage for various electrical cables. Once in position, lower channel stiffener 26 is coupled to vertical upright member 16 through standard seam welds along the outer edges of channel stiffener 26, for example such as along points 92, 94 and 96. Although not shown, seam welds would also extend along other unlabeled outer edges of lower channel stiffener 26 with the above description being true for lower channel stiffener 24 and vertical upright member 14 located at the opposite lower corner of the rectangular framework. To provide further strength, lower channel stiffener 26 is also welded to vertical upright member 16 along each of the numerous elongated weld apertures 112 found within lower channel stiffener 26. Welding material is placed within each elongated weld aperture 112 which couples the lower channel stiffeners 24 and 26 to the vertical upright members 14 and 16 thereby providing an additional weld coupling supplementing the various seam welds used.

By employing lower channel stiffeners 24 and 26, a better distribution of stiffness along the vertical length of the rectangular frame of rack 10 is achieved with very little increase in overall weight. Both the lower and upper channel stiffeners effectively create a path for transferring stress, in the form of lateral forces, from vertical upright members 14 and 16 to base 12 and channel top 18. By doing this overall stiffness and rigidity in the horizontal direction throughout the vertical upright members is increased making equipment rack 10 capable of withstanding the application of abnormally high forces without having to use substantial amounts of thicker, heavier metal as had been the case in past. As shown in FIG. 4, all components of rack 10 are coupled to one another through standard seam welds. For example, gusset 22 is coupled to vertical sidewall 48 of base 12 by a seam weld along seam 116. Vertical sidewall 48 is also coupled in the vertical direction to vertical upright member 16 along seam 118 and back wall 42 of base 12 is coupled in the vertical direction with upright member 16 along seam 120. While not every seam weld is shown, it should be understood that substantially every seam or juncture between independent metal components has a weld applied to the seam to provide extremely strong couplings of the various components of equipment rack 10.

FIG. 7 shows channel top 18 which is comprised of rectangular plate 130 having integrally formed elongated vertical side flanges 132 and 136 and integrally formed vertical end flanges 134 and 138, all of which extend in the same direction which when coupled to vertical upright numbers 14 and 16, as shown in FIG. 8, is in an downward direction. As with the other components of rack 10, the various flanges of channel top 18 are formed through bends 140, 142, 144 and 146. As can be seen from FIGS. 7 and 8, rectangular plate 130 contains numerous mounting apertures 150 and cable access apertures 60 which are provided as convenient positions for cable entry or exit and/or coupling of additional hardware to top 18 of rack 10. Also provided for flexibility are a plurality of hardware mounting apertures 152 located in numerous positions along elongated vertical side flanges 132 and 136. As channel top 118 is formed from a single piece of metal it is simple and inexpensive to manufacture. To provide additional coupling strength, vertical end flanges 134 and 138 both include elongated weld aperture 148 which allows increased welding material to be used to connect channel top 18 with the vertical upright members 14 and 16. Welding material is placed within each elongated weld aperture 148 which couples the vertical end flanges 134 and 138 to the vertical upright members 14 and 16 thereby providing an additional weld coupling supplementing the various seam welds used.

As shown in FIG. 8, channel top 18 is coupled between the upper ends of vertical upright members 14 and 16 with upper channel stiffeners 28 and 30 coupled within the channels created within upright members 14 and 16 at the points at which they couple with channel top 18, similar to the coupling described for lower channel stiffeners 24 and 26.

FIG. 9 shows upper channel stiffener 28 which is substantially similar to the previously described lower channel stiffeners but slightly shorter, although not necessarily. Channel stiffener 28 is comprised of vertical wall 170 having vertical side wall 172 integrally formed through bend 176 with horizontal flange 174 integrally formed with vertical side wall 172 through bend 178. Again, horizontal flange 174 is equipped with numerous cable access apertures 60 and one or more hardware mounting apertures 114. Vertical wall 170 includes cable access aperture 180 and a plurality of elongated weld apertures 182 located in parallel with and at opposite ends of vertical wall 170. As shown in FIG. 10, upper channel stiffener 30 is slid within the channel formed in vertical upright member 16 such that its cable access aperture 180 is aligned with cable access aperture 190 located near the upper end of vertical upright member 16. Channel top 18, vertical upright member 16 and upper channel stiffener 30 are all coupled to one another through seam welds located at each and every outer seam of channel top 18 and upright channel stiffener 30. For example, seam welds are applied along the seams shown at 192, 194, 196 and all other seams although not necessarily labeled. Additional welds are provided within each of the numerous elongated weld apertures 182 thereby providing additional coupling integrity and strength to the upper most corners of the rectangular frame of rack 10.

Although a particular embodiment of the invention has been described above, it should be appreciated that numerous modifications, variations, and adaptations may be made thereto without departing from the scope of the invention as defined in the claims.

What is claimed is:

1. An earthquake resistant equipment rack comprising:
    a base reinforced solely about the periphery thereof;
    at least two vertical upright members coupled to and extending upwardly from said base, said at least two vertical upright members include means for supporting and holding electronic equipment therebetween wherein each of said at least two vertical upright members have an upper end and a lower end;
    a channel top coupled to and extending between the upper ends of said at least two vertical upright members;
    at least two gussets coupled to the lower ends of said at least two vertical upright members, said at least two gussets also being coupled to said base at the points at which said at least two vertical upright members couple with said base, each of said at least two gussets including a vertical side wall, a back wall integrally formed with said vertical side wall and a top integrally formed with said vertical side wall; and
    a plurality of channel stiffeners coupled to the lower and upper ends of said at least two vertical upright members for transferring lateral forces from said at least two vertical upright members to said base and said channel top thereby increasing the overall strength of said equipment rack.

2. An earthquake resistant equipment rack as recited in claim 1, wherein said base comprises:
    a floor;
    a back wall integrally formed with said floor;
    a top integrally formed with said back wall; and
    at least two upstanding side walls integrally formed with said floor to provide structural rigidity to a coupling of said vertical upright members and said base.

3. An earthquake resistant equipment rack as recited in claim 2, wherein
    said integrally formed top includes a vertical flange integrally formed with said top which extends downward from the side of said top opposite said back wall; and
    said integrally formed top includes at least two vertical flanges integrally formed with said top which extend downward from either end of said partial top.

4. An earthquake resistant equipment rack as recited in claim 3, further comprising:
    a front wall integrally formed with said floor; and
    a horizontal flange integrally formed with said front wall which extends rearwardly toward said back wall.

5. An earthquake resistant equipment rack as recited in claim 1, wherein each of said at least two vertical upright members comprises:
    a vertical side wall;
    a first horizontal flange formed integrally with said vertical side wall and terminating in a perpendicular rearwardly directed lip;
    a second horizontal flange formed integrally with said vertical side wall and terminating in a perpendicular forwardly directed lip; and
    a plurality of apertures for holding and mounting electronic equipment between said at least two vertical upright members;
    wherein said vertical side wall, said first and second horizontal flanges and said first and second lips form a channel that spans the length of each of said at least two vertical upright members.

6. An earthquake resistant equipment rack as recited in claim 1, wherein said channel top comprises:
    a rectangular plate;
    two vertical flanges integrally formed along the sides of said rectangular plate and extending downward from said rectangular plate; and
    two vertical flanges integrally formed at the ends of said rectangular plate and extending downward from said rectangular plate.

7. An earthquake resistant equipment rack as recited in claim 6,
    wherein each of said vertical flanges integrally formed at the ends of said rectangular plate includes an elongated weld aperture, said elongated weld aperture providing access to said at least two vertical upright members when said at least two vertical upright members are coupled to said channel top thereby allowing the use of welding material to couple said channel top to and between said at least two vertical upright members.

8. An earthquake resistant equipment rack as recited in claim 6, wherein said channel top includes a plurality of apertures for holding and mounting equipment from and to said equipment rack.

9. An earthquake resistant equipment rack as recited in claim 1, further comprising a horizontal flange integrally formed with said vertical side wall, wherein said horizontal flange is directed inwardly to facilitate positioning and increase the strength of each of said at least two gussets.

10. An earthquake resistant equipment rack as recited in claim 1, wherein said vertical side wall includes a notch located in the front of and on the bottom of said vertical side wall thereby providing relief which allows each of said at least two gussets to properly couple with said front wall of said base.

11. An earthquake resistant equipment rack as recited in claim 1, wherein said vertical side wall includes at least one cable access aperture to provide a path for running electrical cables and connections in and out of said equipment rack.

12. An earthquake resistant equipment rack as recited in claim 1, wherein said vertical side wall includes notch located in the front of and on the top of said vertical side wall thereby providing relief which allows access within each of said at least two gussets for electronic cables, connections and additional seam welds.

13. An earthquake resistant equipment rack as recited in claim 1, wherein said plurality of channel stiffeners comprises:
    at least two lower channel stiffeners received within and coupled to the lower end of said channel formed in each of said at least two vertical upright members; and
    at least two upper channel stiffeners received within and coupled to the upper end of said channel formed in each of said at least two vertical upright members;

wherein said at least two lower channel stiffeners and said at least two upper channel stiffeners create a path which transfers stress, in the form of lateral forces subjected upon said equipment rack, from said at least two vertical upright members to said base and said channel top.

14. An earthquake resistant equipment rack as recited in claim 13, wherein each of said at least two lower and upper channel stiffeners comprises:

a vertical wall;

a side wall integrally formed with said vertical wall; and a horizontal flange integrally formed with said side wall, said horizontal flange extending in the inward direction.

15. An earthquake resistant equipment rack as recited in claim 14, wherein said vertical wall includes a plurality of elongated weld apertures, said elongated weld apertures providing access to said at least two vertical upright members when said at least two vertical upright members are coupled to said at least two lower and upper channel stiffeners thereby allowing the use of welding material to couple said at least two lower and upper channel stiffeners to said at least two vertical upright members.

16. An earthquake resistant equipment rack as recited in claim 14, wherein said vertical wall includes a cable access aperture to provide a path for running electrical cables and connections in and out of said equipment rack.

17. An earthquake resistant equipment rack as recited in claim 1, wherein said base, said at least two vertical upright members, said channel top, said at least two gussets and said plurality of channel stiffeners are each fabricated from metal and all coupled to one another by metal welds.

18. An earthquake resistant equipment rack comprising:

a base having a floor, an integrally formed back wall and top, a front wall, and at least two integrally formed upstanding side walls, wherein said top includes an integrally formed vertical flange extending downward from the side of said top opposite said back wall, wherein said top includes at least two integrally formed vertical flanges extending downward from the ends of said top, and wherein said front wall includes a horizontal flange integrally formed with said front wall which extends rearwardly toward said back wall;

at least two vertical upright members coupled to and extending upwardly from said base, said at least two vertical upright members include means for supporting and holding equipment therebetween, wherein each of said at least two vertical upright members includes an upper end, a lower end, a vertical side wall, a first integrally formed horizontal flange terminating in a perpendicular rearwardly directed lip, a second integrally formed horizontal flange terminating in a perpendicular forwardly directed lip, wherein said vertical side wall, said first and second horizontal flanges and said first and second lips form a channel spanning the length of each of said at least two vertical upright members;

a channel top coupled to and extending between the upper ends of said at least two vertical upright members, said channel top includes a rectangular plate, two integrally formed vertical flanges extending downward from the sides of said rectangular plate, two integrally formed vertical flanges extending downward from the ends of said rectangular plate each of which includes an elongated weld aperture;

at least two gussets coupled to the lower ends of said at least two vertical upright members, said at least two gussets also being coupled to said base at the points at which said at least two vertical upright members couple with said base, wherein each of said at least two gussets includes a vertical wall, an integrally formed back wall and an integrally formed top; and a plurality of channel stiffeners coupled to the lower and upper ends of said at least two vertical upright members, wherein said plurality of channel stiffeners comprises at least two lower channel stiffeners received within and coupled to the lower end of said channel formed in each of said at least two vertical upright members, and at least two upper channel stiffeners received within and coupled to the upper end of said channel formed in each of said at least two vertical upright members, wherein each of said channel stiffeners includes a vertical wall containing a plurality of elongated weld apertures, an integrally formed side wall and an integrally formed horizontal flange extending from said side wall in an inward direction;

wherein said base, said at least two vertical upright members, said channel top, said at least two gussets and said plurality of channel stiffeners are each fabricated from metal and all coupled to one another by metal welds.

* * * * *